June 21, 1966 F. R. RANDALL ETAL 3,257,011
TAIL GATE LOADING APPARATUS
Filed Nov. 18, 1963 5 Sheets-Sheet 1

INVENTORS
FRANCIS R. RANDALL
WILLIAM S. APPLEMAN
BY Schmieding and Fultz

ATTORNEYS

June 21, 1966   F. R. RANDALL ETAL   3,257,011
TAIL GATE LOADING APPARATUS

Filed Nov. 13, 1963   5 Sheets-Sheet 3

INVENTORS
FRANCIS R. RANDALL
WILLIAM S. APPLEMAN
BY Schmieding and Fultz
ATTORNEYS

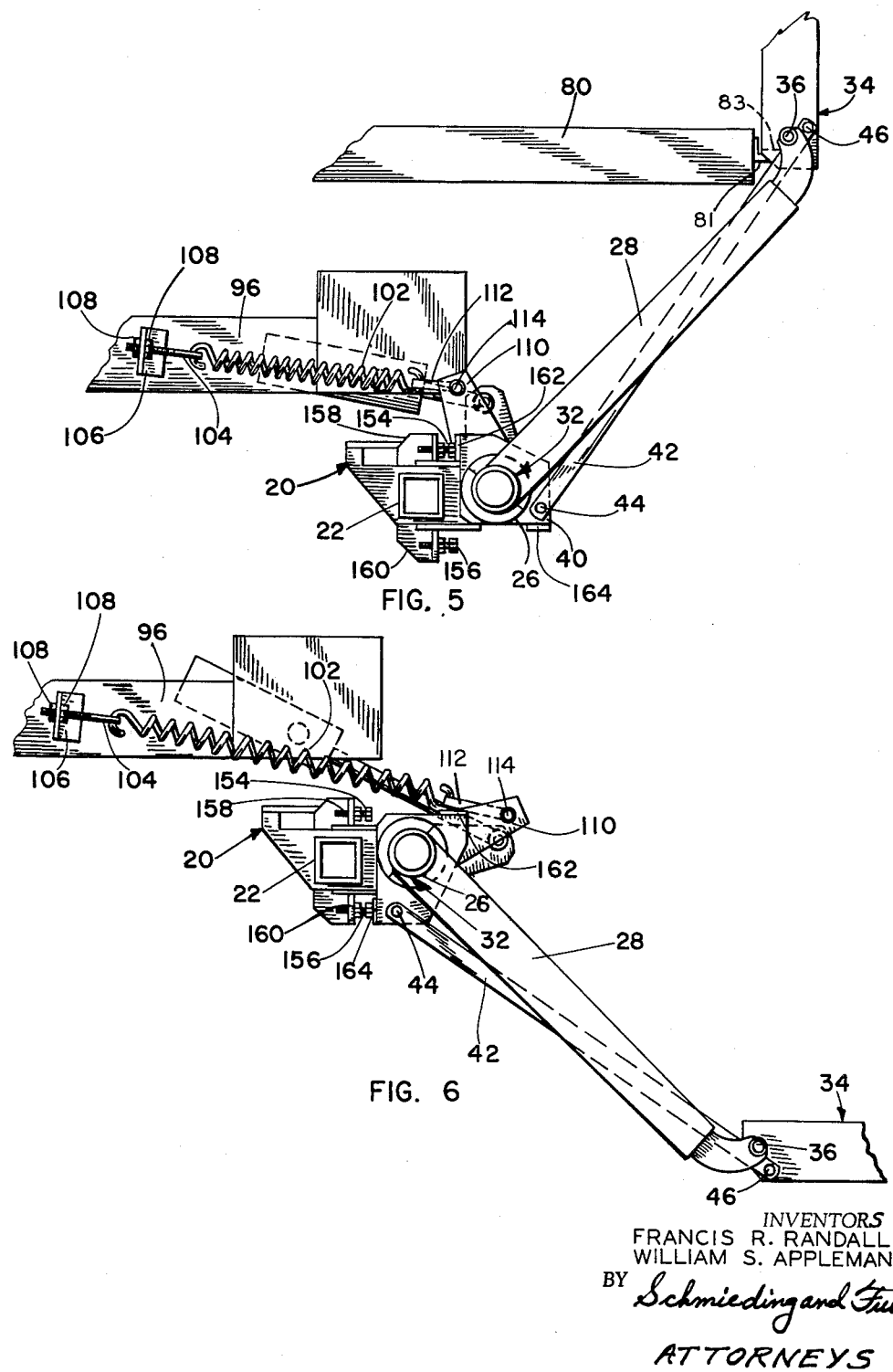

United States Patent Office 3,257,011
Patented June 21, 1966

3,257,011
TAIL GATE LOADING APPARATUS
Francis R. Randall, Mount Gilead, and William S. Appleman, Galion, Ohio, assignors to The Cobey Corporation, Galion, Ohio, a corporation of Ohio
Filed Nov. 18, 1963, Ser. No. 324,327
17 Claims. (Cl. 214—77)

This invention relates to loading apparatus and particularly to an improved power operated loader adapted to be mounted on a truck or other platform to be loaded.

In general, the loading apparatus of the present invention comprises a frame means on which are mounted a pair of lift arms which in turn carry a load supporting platform. A power means, preferably in the form of a hydraulic cylinder, is utilized to move the load supporting platform from between a ground level load supporting position and a truck bed or platform level position at which later position the load being lifted is readily transferred to the truck bed or platform.

In addition, when the loading apparatus is truck mounted it is adapted to rotate the load supporting platform to a tailgate forming position wherein the platform serves as a substitute for the conventional tailgate of the vehicle.

As one aspect of the present invention, the loading apparatus is provided with a novel manually actuated latch for locking the lift platform at the previously mentioned truck bed or platform levels.

As another aspect of the present invention, the loading apparatus comprises a novel adjustable stop arrangement for regulating operation of the linkage so as to permit adjustment of the position of the lift platform to compensate for vehicle spring deflection under predetermined loading of the vehicle. The adjustable stop arrangement also provides means for compensating for normal wear of the lift linkage elements.

It is another object of the present invention to provide a novel tailgate loading apparatus of the type described that includes a novel helper spring arrangement that augments manual closing of the tailgate from a platform level position to a tailgate forming position. This permits one handed operation of the tailgate type loading plaform and eliminates the danger of the tailgate platform falling on the operator.

As still another aspect of the present invention the loading apparatus is provided with a novel power cylinder construction that includes a cylinder member that can be welded to a pivotal mounting means on the frame of the loader without distorting the piston engaging inner wall surface of the cylinder and yet which permits the ready removal of the piston member from the cylinder.

It is, therefore, an object of the present invention to provide an improved loading apparatus that includes a manually actuated latching mechanism for releasably locking the lift linkage when the lift platform is in the tailgate or vertical position.

It is another object of the present invention to provide a loading apparatus that includes a readily adjustable lift linkage that permits taking up slack such that the loading platform can be precisely leveled, regardless of linkage wear or vehicle spring deflection.

It is another object of the present invention to provide an improved tailgate loading apparatus that includes a foot actuated latch mechanism and tailgate support bracket that cooperate to lock the tailgate platform in a vertically extending tailgate forming position.

It is still another object of the present invention to provide an improved loading apparatus that includes a novel hydraulic cylinder construction adapted to be directly attached to a pivotal mounting means on the frame of the apparatus by welding without distorting the cylinder shape which construction also permits ready accessibility to the driving piston.

Further objects and advantages of the present invention will be apparent from the following description, reference being had to the accompanying drawings wherein a preferred form of embodiment of the invention is clearly shown.

In the drawings:

FIG. 5 is a second side elevational view of the apparatus of FIG. 4 showing the lift linkage with the lift platform in the tailgate position;

FIG. 6 is a third side elevational view of the apparatus of FIG. 4 showing the lift linkage apparatus with the lift platform in the ground level loading position;

Figure 1:
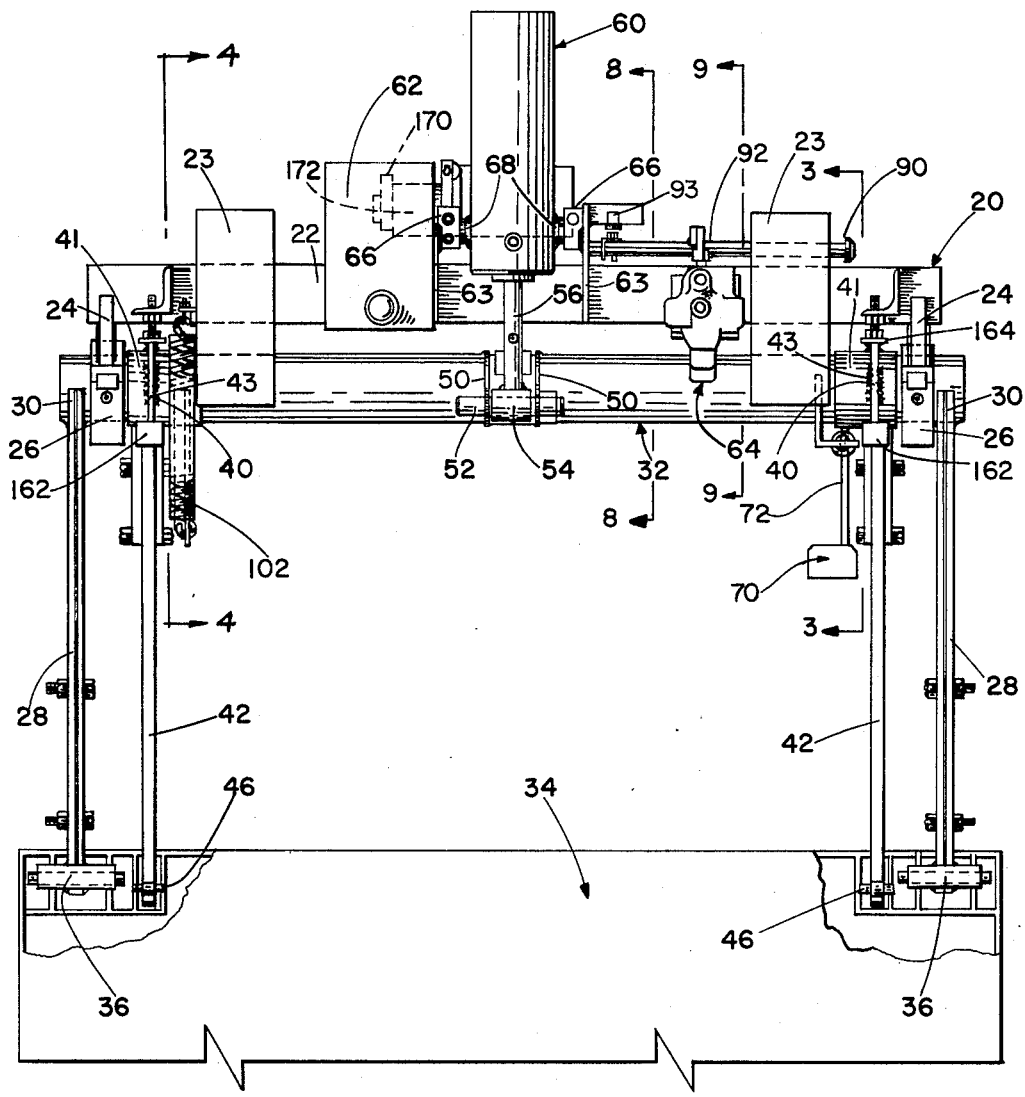
FIG. 1 is a top plan view of a loading apparatus constructed in accordance with the present invention.
Figure 2:
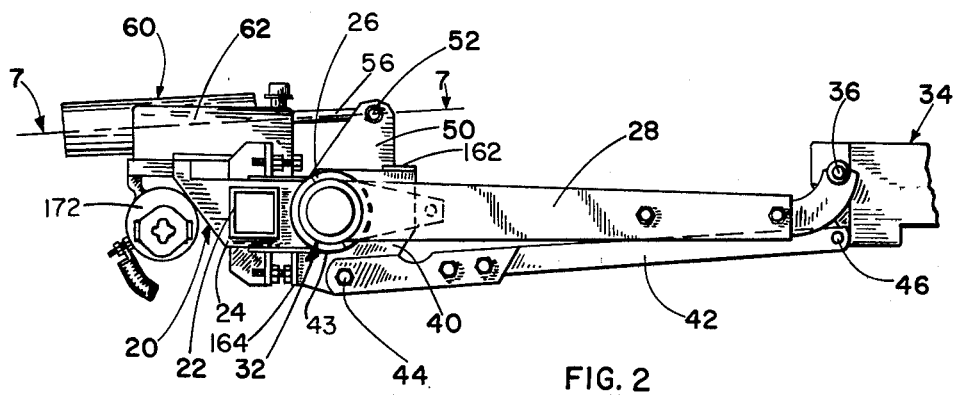
FIG. 2 is a partial side elevational view of the apparatus of FIG. 1.

Referring in detail to the drawings, a loading machine constructed in accordance with the present invention is illustrated in FIGS. 1 and 2, and comprises a frame means indicated generally at 20. The frame means includes a tranverse beam member 22 to which are mounted a pair of frame mounting brackets 23 adapted for attachment to a truck frame or other platform to be loaded.

Two shaft mounting brackets 24 are mounted on beam member 22 and support two spaced shaft bearing members 26.

With continued reference to FIGS. 1 and 2, a pair of right and left main lift arms 28 have their inner ends 30 welded to the ends of a shaft means indicated generally at 32 and the outer ends of the main lift arms include pivotal connections 36 with a load supporting platform indicated generally at 34.

The apparatus further includes right and left secondary arm means indicated generally at 40 having their inner ends welded to collars 41 at welded junctions 43, said collars being rotatably mounted on said shaft means. The outer ends of arms 40 are pivotally connected to links 42 at pivots 44 and the outer ends of links 42 are pivotally attached to lift platform 34 at pivots 46.

Figure 7:
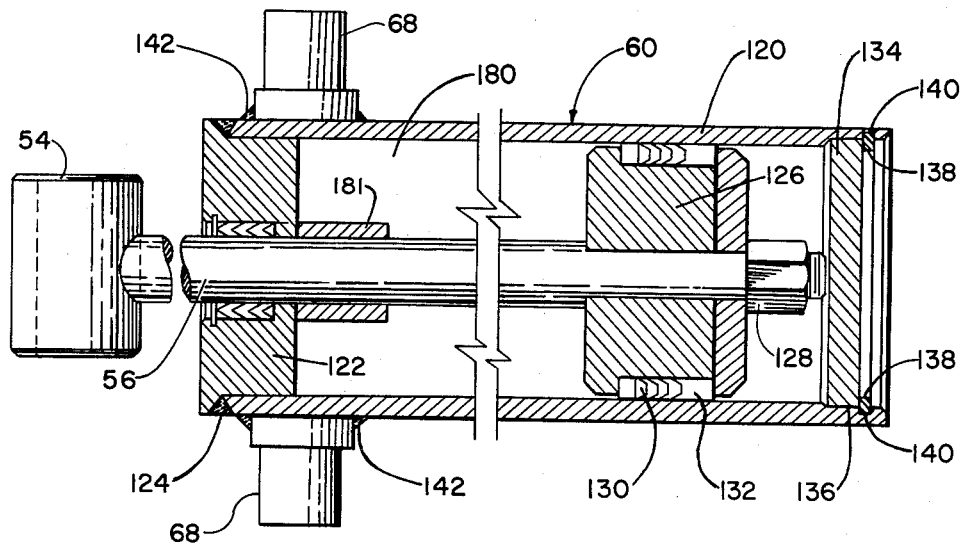
FIG. 7 is a side sectional view of a power cylinder for actuating the loading apparatus of the preceding figures, the section being taken along the line 7—7 of FIG. 2.

The mechanism is actuated by a power cylinder 60, FIGS. 1, 2, and 7, which is pivotally supported by brackets 63 the lower ends of which are welded to beam member 22 and the upper ends of which carry bearing blocks 66 that support pivot pins 68 welded to the side walls of the cylinder.

Shaft means 32 carries rigidly attached arms 50 that support a pivot pin 52, the latter being extended through a bearing member 54 mounted on a piston rod 56 of power cylinder 60.

Figure 9:
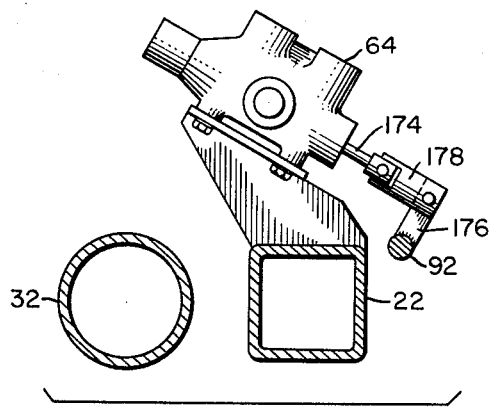
FIG. 9 is a side sectional view of a control valve and actuating mechanism comprising a portion of the apparatus of the present invention, the section being taken along the line 9—9 of FIG. 1.

As seen in FIGS. 1 and 2, fluid for power cylinder 60 is carried in a reservoir 62 and the flow of fluid to and from the hydraulic cylinder is controlled by a manually actuated lever 90 which operates a three-position valve indicated generally at 64 and shown in enlarged side elevation in FIG. 9.

Fluid is pumped from reservoir 62 by means of a pump 170 driven by an electric motor 172 as seen in FIGS. 1 and 2.

Figure 3:
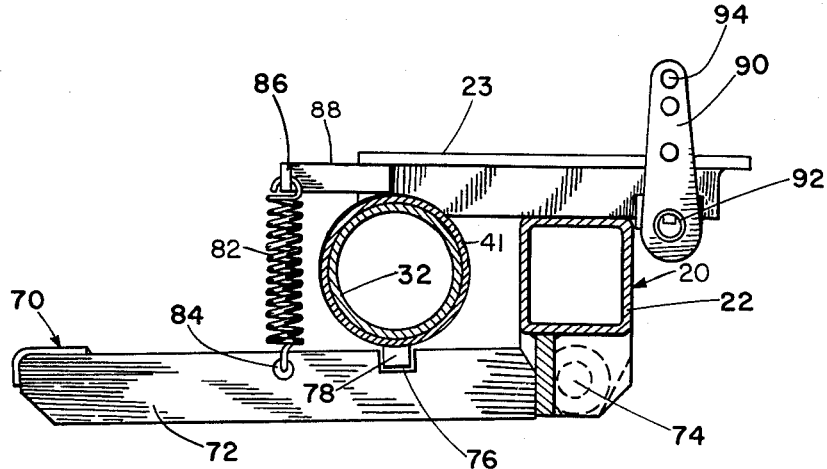
FIG. 3 is a side sectional view showing a manually actuated linkage locking means comprising a portion of the apparatus of the preceding figures, the section being taken along the line 3—3 of FIG. 1.

Referring next to FIGS. 1 and 3, one of the previously mentioned rotary collars 41 is provided with a manually actuated latch means indicated generally at 70 which includes a manually actuated latch lever 72 having an inner end pivotally mounted on beam member 22 at a pivot 74. Lever 72 includes a first latch portion in the form of a recess 76 and a second latch portion 78 mounted on rotary collar 41 so as to enter recess 76 when lift platform 34 is at the closed tailgate position illustrated in FIG. 5. Also, in the position of FIG. 5 the platform 34 is supported by an angle bracket 81 mounted on the gear edge of truck platform 80. A recess 83, FIG. 5, forms a downwardly facing surface that rests on said bracket 81.

Latch lever 72 is constantly urged upwardly, FIG. 3, towards the latched position by a tension spring 82 connected between a hole 84 in the lever and a hole 86 in the end of a bracket 88 the latter being attached to frame mounting brackets 23.

Figure 4:
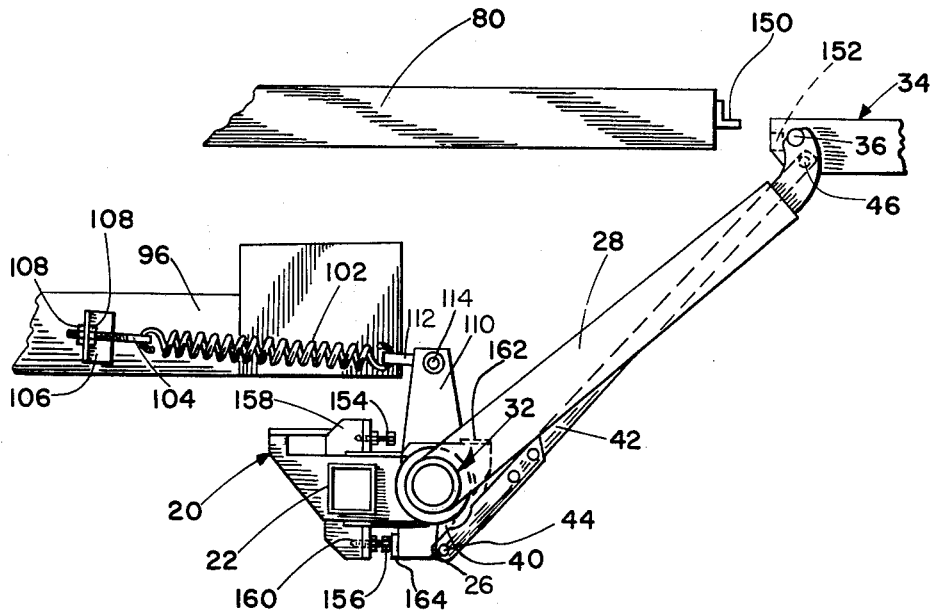
FIG. 4 is a side elevational view showing a lift arm and helper spring comprising a portion of the loading apparatus of FIGS. 1 and 2, the section being taken along the line 4—4 of FIG. 1.

Referring next to FIGS. 4 through 6, the apparatus further includes a helper spring 102 having its inner end connected to an eyebolt 104, the latter being adjustably mounted to a spring mounting bracket 106. The tension of helper spring 102 can be adjusted by varying the locations of nuts 108 on the shank of eyebolt 104. The outer end of helper spring 102 is attached to a helper arm 110 at a pivoted connector 112 the latter being attached to the arm at a pivot pin 114.

Referring next to FIG. 7, the structural components of power cylinder 60 comprises a cylinder housing 120 provided with an outer end closure 122 welded to the outer end of the cylinder housing at a weld 124.

A piston 126 mounted on the inner end of a piston rod 56 by a nut 128 includes an oil seal 130 carried in grooves 132. A round cap member 134 is removably inserted in an annular recess 136 in the cylinder wall and the cap member 134 is retained in place by a snap ring 138 mounted in a groove 140. It will be noted from FIG. 7 that the only welding of cylinder 120 is done at the outer or ram end of the cap welds 124 and mounting pivot welds 142 whereby any distortion of cylinder housing 120, due to the heat of welding, is remote from the operating end of the cylinder wherein the piston travels.

Referring again to FIG. 7, a bushing 181 surrounds piston rod 56 and serves to limit travel of piston 126 to the outer undistorted portion of cylinder 120.

Referring again to FIG. 4 a pair of adjustable stops 154 and 156 are mounted in threaded holes 158 and 160 carried by frame means 20 and the previously described secondary arms 40 of the parallel linkage carry shoulders 162 and 164 arranged to engage stops 154 and 156 and establish the limits of pivoting of secondary arms 40 and collars 41 as will be later described in detail herein.

In operation, platform 34 is manually moved from the tailgate forming position of FIG. 5 to the platform level position of FIG. 4 but the latch mechanism of FIG. 3 must first be released by depressing foot lever 70.

Upon further actuation of lever 90 towards the rear of the apparatus, or to the left in FIG. 3, the spool in control valve 64 is shifted to connect the chamber 180 of power cylinder 60 with reservoir 62. This drains the power cylinder and permits platform 34 to drop downwardly to the ground level or loading position.

In order to lift a load placed on lift platform 34 from the ground level or loading position of FIG. 6, the electric motor is energized by actuating a manual control lever 90 forwardly, or to the right as seen in FIG. 3, which lever is mounted on the end of a control shaft 92, FIG. 1. This actuation closes a starter switch 93, FIG. 8, and thereby completes the circuit to electric motor 172.

Figure 8:
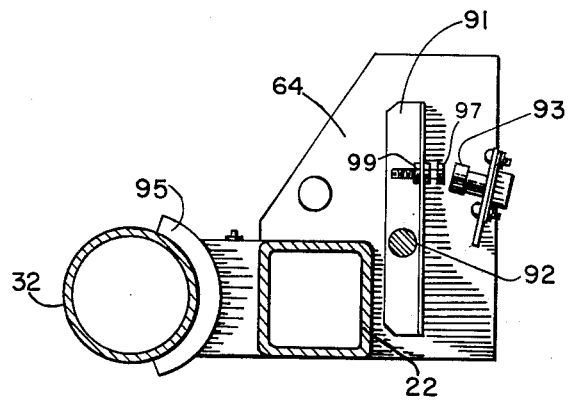
FIG. 8 is a side elevational view of a starter switch and actuating mechanism comprising a portion of the apparatus of the present invention, the section being taken along the line 8—8 of FIG. 1.

With continued reference to FIG. 8, the starter switch assembly includes an adjustable switch actuating screw 97 and lock nuts 99. These are adjusted so as to energize motor 170 only after valve 64 has been opened by rotation of shaft 92 upon actuation of lever 90.

Actuation of manual lever 90 also shifts a plunger rod 174 of control valve 64, FIG. 9, via a valve actuating arm 176 and link 178. This shifts the spool within the valve so as to connect pressure chamber 180 of power cylinder 60 with the outlet of pump 170.

When manual lever 90 is actuated towards the rear of the apparatus, to a centered position, the spool in valve 64 is centered in a closed position whereby pressurized fluid is trapped in the chamber 180 of power cylinder 60. This centering action of lever 90 also breaks the contacts of starter switch 93 and cuts off motor 172 and pump 170. When this occurs load supporting platform 34 is arrested at the bed level or unloading position of FIG. 4 or at any other desired position.

After loading operations are completed, platform 34 is manually pivoted from the horizontal position of FIG. 4 to the vertical tailgate position of FIG. 5 and the manual effort required is greatly reduced by the previously described helper springs 102.

While the form of embodiment of the present invention as herein disclosed constitutes a preferred form, it is to be understood that other forms might be adopted, all coming within the scope of the claims which follow:

We claim:

1. A loading apparatus comprising, in combination, frame means adapted for attachment to a platform to be loaded; bearing means mounted on said frame means; shaft means journaled for rotation in said bearing means; a right lift arm including an inner end attached to said shaft means and an outer end; a left lift arm including an inner end attached to said shaft means and an outer end; a platform including first pivotal connections with said outer ends of said lift arms and a second pivotal connection spaced from said first pivotal connections said platform being pivotable to a vertically extending tailgate position; secondary arm means including an inner end rotatably mounted on said shaft means and an outer end; a link including an inner end pivoted to said outer end of said secondary arm means and an outer end secured to said second pivoted connection of said lift platform; first stop means on said frame means for limiting the upward rotation of said secondary arm means; second stop means on said frame means for limiting the downward rotation of said secondary arm means; power means for rotating said shaft means to swing said lift arms and raise said lift platform from a lower horizontally extending position to an upper horizontally extending position; and means engagable with said secondary arm means for locking said platform in a vertically extending tailgate position.

2. A loading apparatus comprising, in combination, frame means adapted for attachment to a platform to be loaded; bearing means mounted on said frame means; shaft means journaled for rotation in said bearing means; a right lift arm including an inner end attached to said shaft means and an outer end; a left lift arm including an inner end attached to said shaft means and an outer end; a platform including first pivotal connections with said outer ends of said lift arms and a second pivotal connection spaced from said first pivotal connections; secondary arm means including an inner end rotatably mounted on said shaft means and an outer end; a link including an inner end pivoted to said outer end of said secondary arm means and an outer end secured to said second pivoted connection of said lift platform; stop means on said frame means for limiting the rotation of said secondary arm means; power means for rotating said shaft means to swing said lift arms and raise said lift platform from a lower horizontally extending position to an upper horizontally extending position; and a manually actuated lever pivoted on said frame means and including a latch portion engagable with said secondary arm means for locking said lift platform in a vertically extending position.

3. The apparatus defined in claim 2 wherein said secondary arm means includes a collar rotatably mounted on said shaft means and wherein said collar includes a second latch portion detachably engageable with said first latch portion on said lever.

4. A loading apparatus comprising, in combination, frame means adapted for attachment to a platform to be loaded; bearing means mounted on said frame means; shaft means journaled for rotation in said bearing means; a right lift arm including an inner end attached to said shaft means and an outer end; a left lift arm including an inner end attached to said shaft means and an outer end; a platform including first pivotal connections with said outer ends of said lift arms and a second pivotal connection spaced from said first pivotal connections; a pair of collars rotatably mounted on said shaft means; secondary arm means including an inner end mounted on one of said collars and an outer end; a link including an inner end pivoted to said outer end of said secondary arm means and an outer end secured to said second pivoted connection of said lift platform; stop means on said frame means for limiting the rotation of said secondary arm means; power means for rotating said shaft means to swing said lift arms and raise said lift platform from a lower horizontally extending position to an upper horizontally extending position; a second power means operative between said frame means and said secondary arm means for raising said platform to a vertical position; and means engagable with said collars for locking said platform in a vertically extending tailgate position.

5. The apparatus defined in claim 4 wherein said second power means comprises a helper arm mounted on one of said collars, and a helper spring connected to said helper arm for applying torque to said secondary arm means.

6. The apparatus defined in claim 4 including a first latch portion on said collar; and a lever pivoted on said frame means and including a second latch portion detachably engaging said first latch portion.

7. A loading apparatus comprising, in combination, frame means adapted for attachment to a platform to be loaded and including upper and lower adjustable shoulders; bearing means mounted on said frame means; shaft means journaled for rotation in said bearing means; a right lift arm including an inner end attached to said shaft means and an outer end; a left lift arm including an inner end attached to said shaft means and an outer end; a platform including first pivotal connections with said outer ends of said lift arms and a second pivotal connection spaced from said first pivotal connections; a collar rotatably mounted on said shaft means and including first and second shoulders respectively engageable with said upper and lower shoulders for defining upper and lower limits of travel of said collar; a secondary arm including an inner end mounted to said collar and an outer end; a link including an inner end pivoted to said outer end of said secondary arm and an outer end secured to said second pivotal connection of said lift platform; and power means for rotating said shaft means to swing said lift arms and raise said lift platform from a lower horizontally extending position to an upper horizontally extending position.

8. The apparatus defined in claim 7 wherein said collar includes a helper arm; and a helper spring operative between said helper arm and said frame means.

9. A loading apparatus comprising, in combination, frame means adapted for attachment to a platform to be loaded; bearing means mounted on said frame means; shaft means journaled for rotation in said bearing means; a right lift arm including an inner end attached to said shaft means and an outer end; a left lift arm including an inner end attached to said shaft means and an outer end; a lift platform pivotally mounted to said lift arms; linkage means connecting said platform to certain of said means to maintain said platform in a level position; power cylinder means including a cylinder member, a piston mounted for reciprocation in said cylinder member, a removable closure for a first end of said cylinder member, and a piston rod extended from the other end of said cylinder member; a first pivot means welded to the other end of said cylinder member; a second pivot means mounted on said frame means and rotatably connected with said first pivot means; and means forming a driving connection between said piston rod and said shaft means.

10. The apparatus defined in claim 9 wherein said first pivot means is formed by oppositely extending bearing shafts having their inner ends welded to the outer surface of said cylinder member.

11. A loading apparatus comprising, in combination, frame means adapted for attachment to a platform to be loaded; bearing means mounted on said frame means; shaft means journaled for rotation in said bearing means; a right lift arm including an inner end attached to said shaft means and an outer end; a left lift arm including an inner end attached to said shaft means and an outer end; a platform including first pivotal connections with said outer ends of said lift arms and a second pivotal connection spaced from said first pivotal connections; secondary arm means including an inner end rotatably mounted on said shaft means and an outer end; a link including an inner end pivoted to said outer end of said secondary arm means and an outer end secured to said second pivoted connection of said lift platform; stop means on said frame means for limiting the rotation of said secondary arm means; power cylinder means including a cylinder member, a piston mounted for reciprocation in said cylinder member, a removable closure for a first end of said cylinder member, and a piston rod extended from the other end of said cylinder member; a first pivot means welded to the other end of said cylinder member; a second pivot means mounted on said frame means and rotatably connected with said first pivot means; and means forming a driving connection between said piston rod and said shaft means.

12. A loading apparatus comprising, in combination, frame means adapted for attachment to a platform to be loaded; bearing means mounted on said frame means; shaft means journaled for rotation in said bearing means; a right lift arm including an inner end attached to said shaft means and an outer end; a left lift arm including an inner end attached to said shaft means and an outer end; a lift platform pivotally mounted to said lift arms; linkage means connecting said platform to certain of said means to maintain said platform in a level position; a tailgate support bracket for attachment to the edge of said platform to be loaded, said lift platform including an inner edge disposable on said support bracket; and a latch means for locking said linkage means with said load supporting platform disposed in a vertical tailgate forming position wherein said load supporting platform is supported by said bracket.

13. A loading apparatus comprising, in combination, frame means adapted for attachment to a platform to be loaded; bearing means mounted on said frame means; shaft means journaled for rotation in said bearing means; a right lift arm including an inner end attached to said shaft means and an outer end; a left lift arm including an inner end attached to said shaft means and an outer end; a lift platform pivotally mounted to said lift arms; linkage means connecting said platform to certain of said means to maintain said platform in a level position; a fluid motor for actuating said linkage; a pump for supplying fluid to said fluid motor; valve means for controlling the flow of fluid to said fluid motor; an electric motor for driving said pump; switch means for energizing said electric motor; a manual actuator for said switch means and said valve means; and an adjustable connection between said manual actuator and certain of said switch and valve means to adjust the time of opening of said valve means relative to the time of energization of said electric motor.

14. The mechanism defined in claim 13 that includes a rotatably mounted control shaft, said manual actuator, adjustable connection and valve means being operatively connected to said control shaft.

15. A loading apparatus comprising, in combination, frame means adapted for attachment to a platform to be loaded; bearing means mounted on said frame means; shaft means journaled for rotation in said bearing means; a right lift arm including an inner end attached to said shaft means and an outer end; a left lift arm including an inner end attached to said shaft means and an outer end; a platform pivotally mounted on the outer ends of said lift arms; secondary arm means rotatably mounted on said shaft means and in driving engagement with said platform; power means in driving engagement with said shaft means; and a helper spring operatively connected between said collar and said frame means for rotating said secondary arm means relative to said shaft means.

16. A loading apparatus comprising, in combination, frame means adapted for attachment to a platform to be loaded and including upper and lower adjustable shoulders; bearing means mounted on said frame means; shaft means journaled for rotation in said bearing means; a right lift arm including an inner end attached to said shaft means and an outer end; a left lift arm including an inner end attached to said shaft means and an outer end; a platform including first pivotal connections with said outer ends of said lift arms and a second pivotal connection spaced from said first pivotal connections; a collar provided with a first latch portion and rotatably mounted on said shaft means and including first and second shoulders respectively engageable with said upper and lower shoulders for defining upper and lower limits of travel of said collar; a lever pivoted on said frame means and including a second latch portion detachably engaging said first latch portion; a secondary arm including an inner end mounted to said collar and an outer end; a link including an inner end pivoted to said outer end of said secondary arm and an outer end secured to said second pivotal connection of said lift platform; and power means for rotating said shaft means to swing said lift arms and raise said lift platform from a lower horizontally extending position to an upper horizontally extending position.

17. A loading apparatus comprising, in combination, frame means adapted for attachment to a platform to be loaded and including upper and lower adjustable shoulders; bearing means mounted on said frame means; shaft means journaled for rotation in said bearing means; a right lift arm including an inner end attached to said shaft means and an outer end; a left lift arm including an inner end attached to said shaft means and an outer end; a platform including first pivotal connections with said outer ends of said lift arms and a second pivotal connection spaced from said first pivotal connections; a collar provided with a helper arm and rotatably mounted on said shaft means and including first and second shoulders respectively engageable with said upper and lower shoulders for defining upper and lower limits of travel of said collar; a helper spring operative between said helper arm and said frame means; a first latch portion on said collar; a lever pivoted on said frame means and including a second latch portion detachably engaging said first latch portion; a secondary arm including an inner end mounted to said collar and an outer end; a link including an inner end pivoted to said outer end of said secondary arm and an outer end secured to said second pivotal connection of said lift platform; and power means for rotating said shaft means to swing said lift arms and raise said lift platform from a lower horizontally extending position to an upper horizontally extending position.

References Cited by the Examiner
UNITED STATES PATENTS 2,792,135    5/1957    Wood.
3,057,491   10/1962    Schlensker.
3,084,815    4/1963    Johnson.

GERALD M. FORLENZA, *Primary Examiner.*

HUGO O. SCHULZ, *Examiner.*

R. G. SHERIDAN, *Assistant Examiner.*